(12) United States Patent
Ge

(10) Patent No.: US 8,285,274 B2  
(45) Date of Patent: Oct. 9, 2012

(54) MOBILE PHONE AND METHOD FOR ADJUSTING SUSPENSION OF COMMUNICATION TIME OF MOBILE PHONE

(75) Inventor: Chi-Sheng Ge, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 359 days.

(21) Appl. No.: 12/817,189

(22) Filed: Jun. 17, 2010

(65) Prior Publication Data

US 2011/0136514 A1  Jun. 9, 2011

(51) Int. Cl.
H04W 4/00 (2009.01)

(52) U.S. Cl. ............... 455/422.1; 455/421; 455/425; 455/456.1

(58) Field of Classification Search ............... 455/404.2, 455/421, 422.1–423, 425, 456.1–457
See application file for complete search history.

(56) References Cited

U.S. PATENT DOCUMENTS

| 6,597,906 B1 * | 7/2003 | Van Leeuwen et al. ... 455/422.1 |
| 6,721,572 B1 * | 4/2004 | Smith et al. ............ 455/456.1 |
| 7,676,224 B1 * | 3/2010 | Bellovin .................. 455/423 |
| 2010/0240346 A1 * | 9/2010 | Jain et al. ............... 455/414.1 |

* cited by examiner

Primary Examiner — George Eng  
Assistant Examiner — Marcus Hammonds  
(74) Attorney, Agent, or Firm — Altis Law Group, Inc.

(57) ABSTRACT

A method for adjusting a suspension of communication time of a mobile phone is provided. Wherein the mobile phone receives wireless signals from a base station and transmits signals to the base station. The wireless signals include the suspension of communication time. The method includes decoding the received wireless signal and determining whether there are too many failed attempts to decode wireless signals in a first predetermined time, further determining the mobile phone enters a dead zone of a network, and determining size of dead zone and sensing movement speed of the phone to determine when the mobile phone will leave the dead zone. If the mobile phone will leave the dead zone soon, maintaining the connection with the network, otherwise hanging up the call.

6 Claims, 2 Drawing Sheets

MOBILE PHONE AND METHOD FOR ADJUSTING SUSPENSION OF COMMUNICATION TIME OF MOBILE PHONE

BACKGROUND

1. Technical Field

The present disclosure relates to the wireless communication field and, particularly, to a mobile phone and a method for adjusting a suspension of communication time of the mobile phone.

2. Description of Related Art

It is a common occurrence that a call placed using a mobile phone is dropped when the mobile phone enters a dead zone. Commonly what happens is that a phone conversation may temporarily become one sided. That is one party hears the other but cannot be heard. Generally, phones are programmed to hang up (drop the call) after a certain amount of time has passed. In such case, to reconnect, the user must re-dial the number once clear of the dead spot, which is inconvenient and not always successful as the other party may be trying to re-dial at the same time.

BRIEF DESCRIPTION OF THE DRAWINGS

The components of the drawings are not necessarily drawn to scale, the emphasis instead being placed upon clearly illustrating the principles of a mobile phone and a method for adjusting suspension communication time of the mobile phone. Moreover, in the drawings, like reference numerals designate corresponding parts throughout several views.

DETAILED DESCRIPTION

Figure 1:
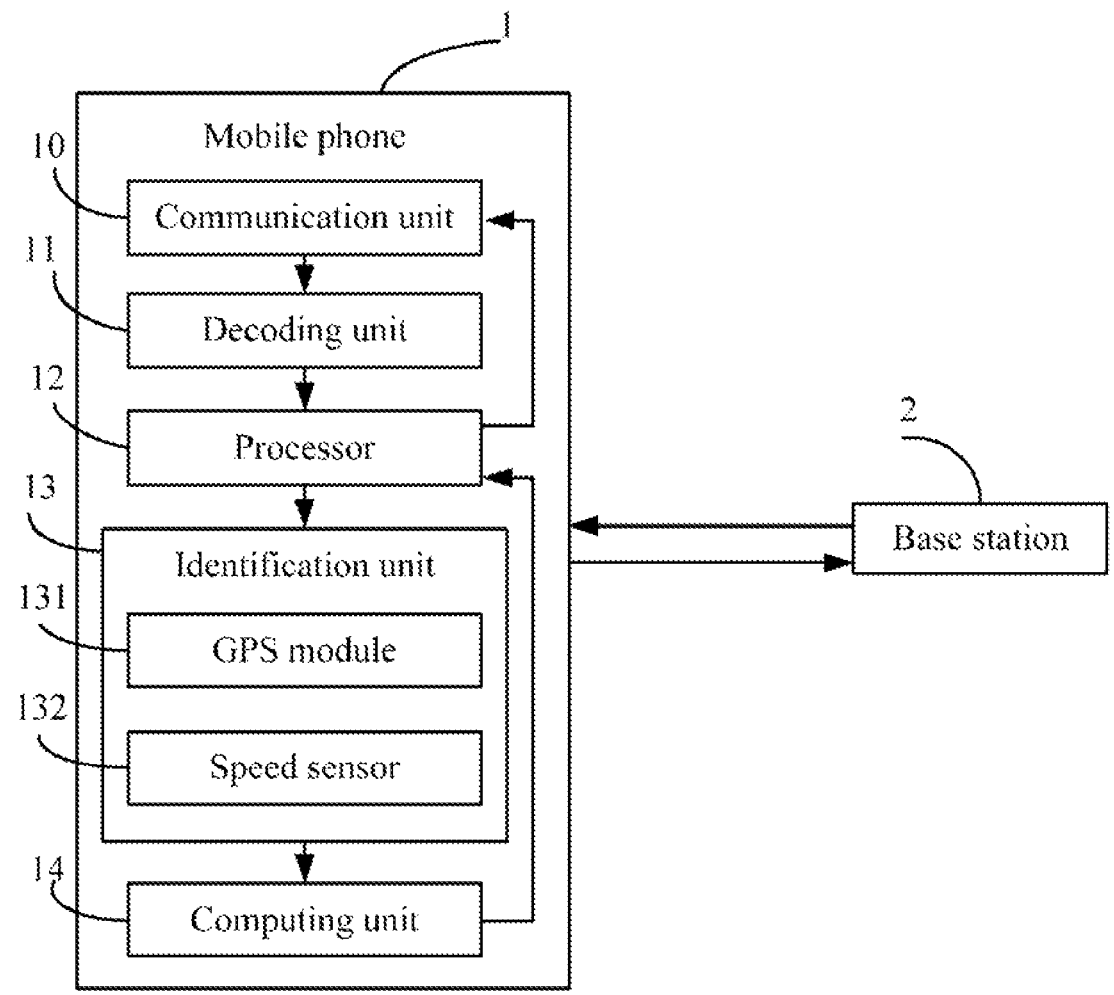
FIG. 1 is a block diagram of a mobile phone in accordance with an exemplary embodiment.

Referring to FIG. 1, a mobile phone 1 and a base station 2 are shown. The mobile phone 1 can communicate with other communication devices via the base station 2.

The mobile phone 1 includes a communication unit 10, a decoding unit 11, a processor 12, an identification unit 13, and a computing unit 14.

The communication unit 10 is configured to receive wireless signals from the base station 2 and to transmit signals processed by the mobile phone 1 to the base station 2. In the embodiment, the wireless signals include Slow Associated Control Channel (SACCH) signals. A suspension of communication time is transmitted to the mobile phone 1 with the SACCH signal. The suspension of communication time is employed to determine how long after a call is disrupted, the mobile phone 1 will hang up.

The decoding unit 11 is configured to decode the received wireless signals when the mobile phone 1 communicates with another phone.

The processor 12 is configured to determine whether the number of times the decoding unit 11 fails to decode the signal correctly exceeds a predetermined number within a first predetermined time. If yes, the processor 12 determines the mobile phone 1 enters a network coverage dead zone. If not, the decoding unit 11 continues decoding.

The identification unit 13 includes a GPS module 131 and a speed sensor 132. The GPS module 131 is configured to obtain a length L of the dead zone along the mobile phone's moving direction. The speed sensor 132 is configured to sense a movement speed V of the mobile phone 1. In the embodiment, the speed of the mobile phone 1 is constant to simplify explanation.

The computing unit 14 is configured to calculate a time T of the presence of the mobile phone 1 in the dead zone according to a formula $T=L/V$. The computing unit 14 further calculates the difference between the time T and the suspension of communication time.

The processor 12 is further configured to judge whether the difference exceeds a second predetermined time. If the difference exceeds the second predetermined time, the processor 12 controls the mobile phone 1 to hang up. In the embodiment, the difference exceeding the second predetermined time means that the length of the dead zone is too long or the user is traveling too slowly, perhaps on foot. If the difference does not exceed the second predetermined time, such as when a user is in a car and passing through the dead zone quickly, the processor 12 sets the time T as a new suspension of communication time. Within the new suspension of communication time, the mobile phone 1 is still in a communication state though the user may not talk with another person by the mobile phone 1. When the new suspension of communication time elapses, that is, when the mobile phone 1 moves out of the dead zone, disruption should be ended and the user can resume their conversation without having to re-dial the call, which is convenient.

Figure 2:
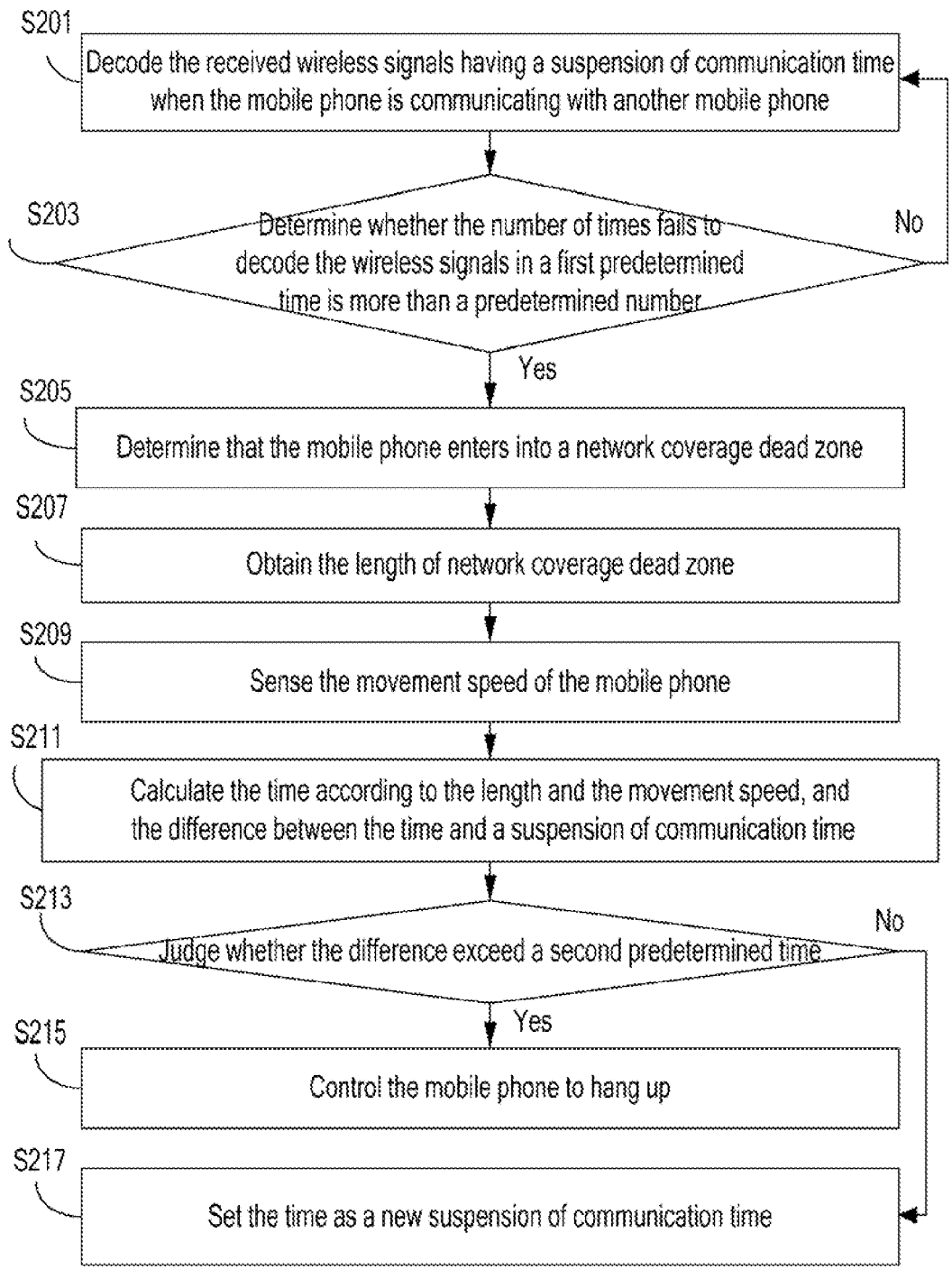
FIG. 2 is a flowchart of a method for adjusting a suspension of communication time of the mobile phone of FIG. 1, in accordance with an exemplary embodiment.

FIG. 2 is a flowchart of a method for adjusting a suspension of communication time of the mobile phone 1 in accordance with an exemplary embodiment.

In step S201, the decoding unit 11 decodes the received wireless signals when the mobile phone 1 is communicating with another mobile phone.

In step S203, the processor 12 judges whether the number of times fails to decode the wireless signals is more than the predetermined number within a first predetermined time. If the number of times fails to decode the wireless signals is more than the predetermined number, the procedure goes to step S205. Otherwise, the procedure goes to step S201.

In step S205, the processor 12 determines that the mobile phone 1 enters a network coverage dead zone.

In step S207, the GPS module 131 obtains the length of the determined dead zone.

In step S209, the speed sensor 132 senses the movement speed of the mobile phone 1.

In step S211, the computing unit 14 calculates a time T of the mobile phone 1 in the entered dead zone according to the formula $T=L/V$. The computing unit 14 further calculates the difference between the time T and the suspension of communication time of the wireless signal from the base station 2.

In step S213, the processor 12 judges whether the difference exceeds the second predetermined time. If the difference exceeds the second predetermined time, the procedure goes to step S215. Otherwise, the procedure goes to step S217.

In step S215, the processor 12 controls the mobile phone 1 to hang up.

In step S217, the processor 12 sets the movement time T as a new suspension of communication time.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A mobile phone, comprising:
   a communication unit configured for receiving wireless signals from a base station and transmitting wireless signals processed by the mobile phone to the base station, the received wireless signals comprising a suspension of communication time;
   a decoding unit configured for decoding the received wireless signals when the mobile phone is communicating with another mobile phone;
   a processor configured for determining whether a number of times the decoding unit fails to successfully decode the received wireless signals is more than a predetermined number in a first predetermined time, and further determining that the mobile phone enters a network coverage dead zone when the number of times the decoding unit fails to decode the received wireless signals correctly is more than the predetermined number;
   an identification unit configured for obtaining a length of the dead zone and sensing a speed of travel of the mobile phone; and
   a computing unit configured for calculating a time according to the length of the dead zone and the speed of travel of the mobile phone, and calculating a difference between the time and the suspension of communication time;
   wherein the processor is further configured for determining whether the difference exceeds a second predetermined time, and setting the time as a new suspension of communication time of the mobile phone when the difference does not exceed the second predetermined time.

2. The mobile phone described as claim 1, wherein when the number of times the decoding unit fails to decode the received wireless signal is not more than the predetermined number, the decoding unit continues decoding.

3. The mobile phone described as claim 1, wherein the identification unit comprising a GPS (global positioning system) module and a speed sensor, the GPS module is configured to obtain the length of the network coverage dead zone, the speed sensor is configured to sense the speed of travel of the mobile phone in the dead zone.

4. The mobile phone described as claim 1, wherein the processor is further configured to control the mobile phone to hang up when the difference between the time and the suspension of communication time exceeds the second predetermined time.

5. A method for adjusting a suspension of communication time of a mobile phone, the mobile phone receiving wireless signals from a base station and transmitting wireless signals to the base station, the received wireless signals comprising a suspension of communication time, the method comprising:
   decoding the received wireless signals when the mobile phone is communicating with another mobile phone;
   determining whether a number of times the mobile phone fails to decode the received wireless signals is more than a predetermined number in a first predetermined time;
   determining that the mobile phone enters a network coverage dead zone when the number of times the mobile phone fails to decode the received wireless signals is more than the predetermined number;
   obtaining a length of the dead zone and sensing a speed of travel of the mobile phone in the dead zone;
   calculating a time according to the length of the dead zone and the speed of travel of the mobile phone, and calculating a difference between the time and the suspension of communication time;
   judging whether the difference between the time and the suspension of communication time exceeds a second predetermined time; and
   setting the time as a new suspension of communication time of the mobile phone when the difference does not exceed the second predetermined time.

6. The method for adjusting a suspension of communication time of the mobile phone described as claim 5 further comprising:
   controlling the mobile phone to hang up when the difference between the time and the suspension of communication time exceeds the second predetermined time.

* * * * *

UNITED STATES PATENT AND TRADEMARK OFFICE
CERTIFICATE OF CORRECTION

PATENT NO. : 8,285,274 B2  Page 1 of 1
APPLICATION NO. : 12/817189
DATED : October 9, 2012
INVENTOR(S) : Chi-Sheng Ge It is certified that error appears in the above-identified patent and that said Letters Patent is hereby corrected as shown below:

Title Page, below Item (65) insert

-- (30)   Foreign Application Priority Data

Dec. 4, 2009   (CN) ..........................200910310943.3 --.

Signed and Sealed this
Twenty-fourth Day of June, 2014

Michelle K. Lee
*Deputy Director of the United States Patent and Trademark Office*